United States Patent
Isman

(10) Patent No.: US 6,266,804 B1
(45) Date of Patent: *Jul. 24, 2001

(54) METHOD FOR ANALYZING CAPACITY OF PARALLEL PROCESSING SYSTEMS

(75) Inventor: Marshall A. Isman, Newton, MA (US)

(73) Assignee: AB Initio Software Corporation, Cambridge, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,142

(22) Filed: Dec. 23, 1997

(51) Int. Cl.⁷ ...................................................... G06F 9/45
(52) U.S. Cl. ...................................................... 717/4; 717/9
(58) Field of Search ................................ 395/704; 717/4, 717/9; 703/22

(56) References Cited

U.S. PATENT DOCUMENTS

| 5,475,842 | * | 12/1995 | Gilbert et al. | 395/706 |
| 5,522,022 | * | 5/1996 | Rao et al. | 345/440 |
| 5,742,814 | * | 4/1998 | Balasa et al. | 707/102 |
| 5,806,059 | * | 9/1998 | Tsuchida et al. | 707/2 |
| 5,935,216 | * | 8/1999 | Benner et al. | 709/248 |

OTHER PUBLICATIONS

IBM, Database 2 AIX/6000 Programming Reference manual, 1993, pp. 282–283.

Apers, Peter M.G., et al., "PRISM/DB: A Parallel, Main Memory Relational DBMS", Dec. 1992, IEEE Transactions on Knowledge and Data Engineering, vol. 4, No. 6, pp. 541–554.

Boral, Haran, et al., "Prototyping Bubba, A Highly Parallel Database System", Mar. 1990, IEEE Transactions on Knowledge and Data Engineering, vol. 2, No. 1, pp. 4–23.

DeWitt, David J., et al., "The Gamma Database Machine Project", Mar. 1990, IEEE Transactions on Knowledge and Data Engineering, vol. 2, No. 1., pp. 44–62.

Frieder, Ophir and Chaitanya K. Baru, "Site and Query Scheduling Policies in Multicomputer Database Systems", Aug. 1994, IEEE Transactions on Knowledge and Data Engineering, vol. 6, No. 4, pp. 609–619.

Graefe, Goetz, "Volcano—An Extensible and Parallel Query Evaluation System", Feb. 1994, IEEE Transactions on Knowledge and Date Engineering, vol. 6, No. 1, pp. 120–135.

Graefe, Goetz and Diane L. Davison, "Encapsulation of Parallelism and Architecture–Independence in Extensible Database Query Execution", Aug. 1993, IEEE Transactions on Software Engineering, vol. 19, No. 8, pp. 749–764.

Afrati et al. Performance considerations on a random graph model for parallel processing, Informatique Theorique et applications. Abstract, 1993.*

Li et al. Load balancing problems for multiclass jobs in distributed/parallel computer systems. IEEE. pp. 322–332, Mar. 1998.*

Rim et al. An efficient dynamic load balancing using the dimension exchange method for balancing of quantized loads on hypercube multiprocessors. IEEE. pp. 708–712, 1999.*

Samanta et al. Load balancing for multi–projector rendering systems. ACM. pp. 107–116, Apr. 1999.*

* cited by examiner

Primary Examiner—Mark Powell
Assistant Examiner—Wei Zhen
(74) Attorney, Agent, or Firm—Fish & Richardson PC

(57) ABSTRACT

A method for analyzing the performance and capacity of an application and a parallel processing system. Based upon a graph representation of the application and system and upon supplied performance values, a data file is created which describes the graph and values. Using that data file, performance equations are generated which model the performance of the application and the system. The model is displayed and modified by the user to allow analysis, evaluation, and extrapolation.

12 Claims, 7 Drawing Sheets

TH
TI, SpreadsheetPath=c:|My Documents|marshall|capdemo|scoring.xls
TI, Time=hour
TI, SheetTitle=Scoring CH
CT, Disk I/O, 3.0
CT, Hash, 10
CT, Send, 2
CT, Sort, 0.5
CT, Merge and transform, 2
CT, Aggregate, 2
CT, Score, 2

GH
GT, Sort detail data, 68, 94, Sort=1,Disk I/O=1,CPUTIME=12500
GT, Sort customer data, .3, 82, Sort=1, Disk I/O=1, CPUTIME=300
GT, Merge and transform, 68, 169, Merge and transform=1, CPUTIME=5700
GT, Aggregate, 68,169,Aggregate=1, CPUTIME=6300
GT, Score, .3,94, Disk I/O=1, Score=1, CPUTIME=20
FH

*FIG. 3*

SCORING

| PERFORMANCE MODEL /500 | COMP RATE (MB/SEC) /502 | # PARTS /504 | #RECORDS (MILLIONS) /506 | RECORD SIZE (BYTES) /508 | TOTAL SIZE (GB) /510 | DISK I/O (GB) /512 | NET I/O (GB) /514 | TOTAL DATA (GB) /516 | TOTAL TIME (HOURS) /518 | PERCENT OF TOTAL TIME /520 |
|---|---|---|---|---|---|---|---|---|---|---|
| SORT DETAIL DATA | 0.5 | 2 | 68.0 | 94.0 | 6.4 | 6.4 | | 6.4 | 3.6 | 14.9% |
| SORT CUSTOMER DATA | 0.5 | 2 | 0.3 | 82.0 | 0.0 | 0.0 | | 0.0 | 0.0 | 0.1% |
| MERGE AND TRANSFORM | 0.3 | 2 | 68.0 | 169.0 | 11.5 | | | 11.5 | 10.6 | 44.7% |
| AGGREGATE | 0.4 | 1 | 68.0 | 169.0 | 11.5 | | | 11.5 | 9.1 | 38.3% |
| SCORE | 0.8 | 1 | 0.3 | 94.0 | 0.0 | 0.0 | | 0.0 | 0.0 | 0.0% |
| DISK I/O | 4.0 | | | | | 6.4 | | 0.4 | 1.9% | |
| NETWORK I/O | 5.0 | | | | | | 0.0 | 0.0 | 0.0 | 0.0% |
| TOTAL CPU HOURS /522 | 23.8 | | | | | | | | | |

ELAPSED TIME

| PERFORMANCE MODEL /524 | COMP RATE (MB/SEC) /526 | # PARTS /528 | #RECORDS (MILLIONS) /530 | RECORD SIZE (BYTES) /532 | TOTAL SIZE (GB) /534 | DISK I/O (GB) /536 | NET I/O (GB) /538 | TOTAL DATA (GB) /540 | TOTAL TIME (HOURS) /542 | PERCENT OF TOTAL TIME /544 |
|---|---|---|---|---|---|---|---|---|---|---|
| SORT DETAIL DATA | 0.5 | 2 | 68.0 | 94.0 | 6.4 | 3.2 | | 3.2 | 1.8 | 10.8% |
| SORT CUSTOMER DATA | 0.5 | 2 | 0.3 | 82.0 | 0.0 | 0.0 | | 0.0 | 0.0 | 0.0% |
| MERGE AND TRANSFORM | 0.3 | 2 | 68.0 | 169.0 | 11.5 | | | 5.7 | 5.3 | 32.3% |
| AGGREGATE | 0.4 | 1 | 68.0 | 169.0 | 11.5 | | | 11.5 | 9.1 | 55.4% |
| SCORE | 0.8 | 1 | 0.3 | 94.0 | 0.0 | 0.0 | | 0.0 | 0.0 | 0.1% |
| DISK I/O | 4.0 | | | | | 3.2 | | 0.2 | 1.4% | |
| NETWORK I/O | 5.0 | | | | | | 0.0 | 0.0 | 0.0 | 0.0% |

ESTIMATED ELAPSED HOURS 16.5 /546
WALL CLOCK TIME (HOURS) 16.9 /548
% CPU BUSY 97.4% /550

FIG. 5

METHOD FOR ANALYZING CAPACITY OF PARALLEL PROCESSING SYSTEMS

TECHNICAL FIELD

The invention relates to the analysis of computer systems and, more particularly, to the analysis of the execution of application programs by parallel processing systems.

BACKGROUND OF THE INVENTION

As the capabilities of computer processors and data storage devices have expanded in recent years, the data sets which are being processed have also increased dramatically in size. Despite rapid improvements, the performance and capacity of a system are often limited by processor speed.

One solution to such limitations has been to divide processing tasks into pieces and have multiple processors operate simultaneously upon those pieces. This approach reduces the burden on each processor and allows tasks which are not interdependent to be performed at the same time, or in parallel. A system configured in this way, with multiple processors operating in parallel, is called a parallel processing system. For purposes of this discussion, parallel processing systems include any configuration of computer systems using multiple central processing units (CPUs), either local (e.g., multiprocessor systems such as SMP or MPP computers), or locally distributed (e.g., multiple processors coupled via LAN or WAN networks), or any combination thereof.

Parallel processing allows an application to perform the same overall task more quickly. Alternately, an application on a parallel processing system can process more data in the same amount of time than on a single processor system. With the improvements in performance and capacity parallel processing allows, there is a need to evaluate those characteristics when running an application on a parallel processing system, either in place or proposed, or the effect of variation in the amount of data on performance of an application running on a particular parallel processing system.

In order to help analyze the performance of an application on a system, a model is used which represents the components of the application and the system and their interaction with supplied data sets. Because of the generally linear nature of data flow through a computer system, graphs have been used to describe these systems. The vertices in a graph represent either data files or processes, and the links or "edges" in the graph indicating that data produced in one stage of processing is used in another.

The same type of graphic representation may be used to describe applications on parallel processing systems. Again, the graphs will be composed of data, processes, and edges or links. In this case, the representation captures not only the flow of data between processing steps, but also the flow of data from one processing node to another. Furthermore, by replicating elements of the graph (e.g., files, processes, edges), it is possible to represent the parallelism in a system.

FIG. 1 shows an example of a graph describing an application on a parallel processing system with three processors. The application performs essentially two tasks: a transformation and a sort. Initially, the data is divided into three sections, represented by a vertex INPUT PARTITION. Each section is sent to one of three different processors, as represented by three links 10, 11, and 12. Each of the three processors performs one or more tasks on a corresponding data section. This allocation of tasks is represented by three sets of vertices, TRANSFORM 1 and SORT 1, TRANSFORM 2 and SORT 2, and TRANSFORM 3 and SORT 3. That is, the first processor performs a transformation and then sorts its section of data (TRANSFORM 1 and SORT 1) and so on. At the end, the data is aggregated together and output as a unified whole, represented by a vertex OUTPUT AGGREGATION.

It is very difficult, however, to predict and model the performance of applications on parallel processing systems. As with single processor systems, these predictions depend on the amount of data which must be processed and the resources required for that processing. However, in addition to information about CPU processing speeds and requirements, data set sizes, memory utilization, and disk usage, information about effective communication rates between processors and network performance becomes necessary. With multiple processors acting in parallel, possibly at different speeds and on different amounts of data, and interconnected by channels or links having different rates, the computations can become quite complex.

For example, many parallel system configurations are purchased based on the size of the database to be processed. An arbitrary rule of thumb is typically then applied to compute the number of processors required based on a ratio of processors to gigabytes of disk storage. This kind of over-simplification often results in systems which are wildly out of balance in the amount of processing or networking bandwidth required based on the actual computation that is required.

Accordingly, the inventor has determined that it would be desirable to be able to analyze the performance of an application executing on a parallel processing system. It would also be desirable to be able to estimate such performance based on assumed data set sizes and variations of the architecture of a parallel processing system. The present invention provides such abilities.

SUMMARY OF THE INVENTION

The invention provides a method by which the resources necessary to run an application or a set of applications on a parallel processing system can be effectively estimated, measured, and verified. The preferred embodiment creates a data file from a graph describing the application on the parallel processing system. Using that data file, plus the processing speeds of system components, the flow of data, and the size and counts of data records throughout the system, equations for the amount of time required for each component are determined.

These equations are then used to provide calculations of processing times on supplied data sets. This information preferably is displayed in spreadsheet form. Charts can be created by calculating times for multiple data sets. Future trends can be predicted by analyzing historical data and such analyses can be displayed in spreadsheets or charts as well.

For evaluation of actual systems, information about the components, such as processing speed, is updated as execution of the application is monitored. This allows measuring of current systems as well as verification of performance.

The details of the preferred embodiment of the invention are set forth in the accompanying drawings and the description below. Once the details of the invention are known, numerous additional innovations and changes will become obvious to one skilled in the art.

BRIEF DESCRIPTION OF THE DRAWINGS

FIG. 3 is an example according to one embodiment of the invention of a flat data file describing a graph.

FIG. 5 is an example according to one embodiment of the invention of a spreadsheet showing information about an application's execution on a parallel processing system.

DETAILED DESCRIPTION OF THE INVENTION

Throughout this description, the preferred embodiments and examples shown should be considered as exemplars, rather than as limitations on the present invention.

Overview

The invention builds upon the invention described in co-pending U.S. patent application Ser. No. 08/678,411, entitled "Executing Computations Expressed as Graphs," filed Jul. 2, 1996, assigned to the assignee of the present invention. The present invention encompasses two preferred embodiments. One embodiment generates a "snapshot analysis" based on a flat file produced by a graph compiling module. This embodiment enables a user to evaluate the performance and capacity of applications on various parallel processing systems by altering input values. The variable input values and resulting calculations preferably are displayed in a spreadsheet format, such as Microsoft Excel™. A second embodiment creates an "analysis over time" based on the same equations generated in the first embodiment applied to multiple sets of values. The sets of values are supplied as present information, past recorded information, presently measured information, or estimated values determined by analysis of past values and then extrapolating into the future. This embodiment enables a user to examine past trends or future trends. The information preferably is displayed in chart format, with user-definable axes.

Such embodiments may be used to analyze the strengths and weaknesses of an application and system presently in use, revealing bottlenecks. The models created by such embodiments also show the impact on performance of changes in the amount of data which needs to be processed. Alternately, by varying the processing and linkage components within the model, different parallel processing system configurations can be compared. Accordingly, predictions about future resource requirements and performance characteristics can be made.

An example of use of the invention is in system purchasing for a database project. If a user is aware of the application to be used and the size of database which will be analyzed (a corporate personnel database for example), the performance characteristics of various hardware configurations are clearly important. The user most likely has targets for performance and needs to know what components or configuration will meet the user's needs. An embodiment of the present invention will allow the user to generate performance evaluations of multiple system configurations. The user can then compare these evaluations to reach an optimal hardware and software solution to match the user's specific needs.

Snapshot Analysis

Figure 1:
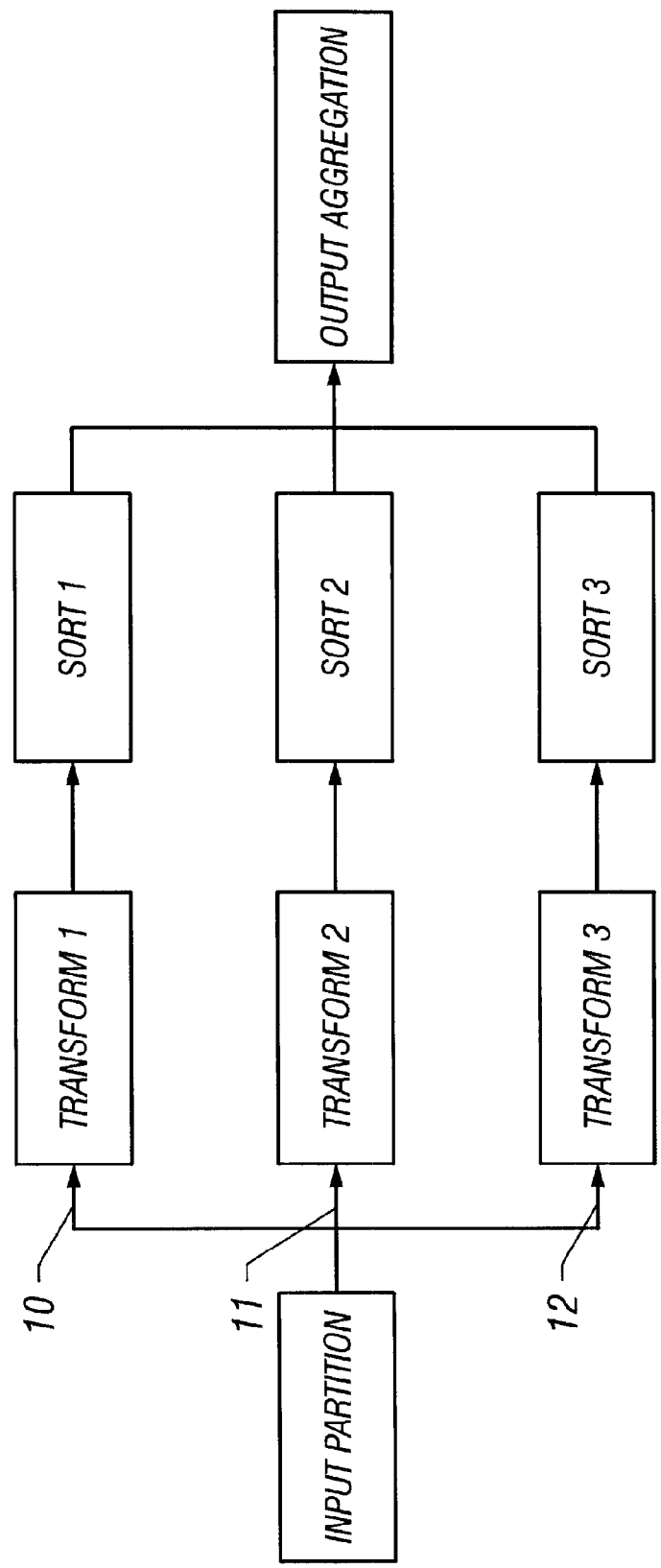
FIG. 1 is a graph describing an application executing on a parallel processing system, in accordance with the prior art.
Figure 2:
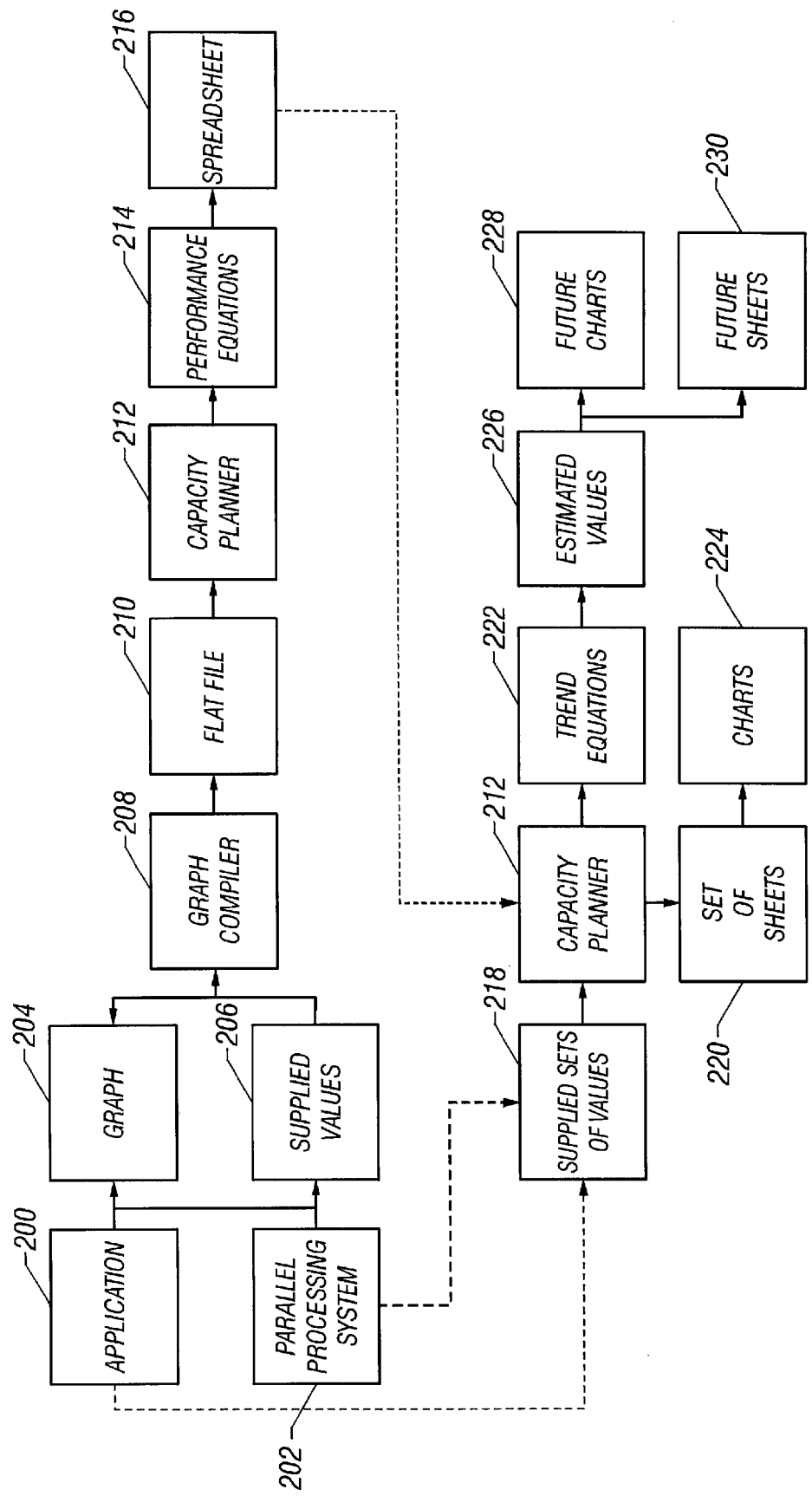
FIG. 2 is a flowchart according to one embodiment of the invention which shows the steps in generating a spreadsheet containing performance equations describing an application on a parallel processing system and generating comparisons of present, previous, and predicted values.

The upper section of FIG. 2 (up to the dashed arrows) shows the basic steps in generating a snapshot analysis. As shown in FIG. 1 and discussed above, an application 200 may be described by a graph 204. The graph 204 may also incorporate the parallel nature of the system 202 upon which the application 200 is run (see FIG. 1). Accordingly, execution of a particular application 200 upon a particular parallel processing system 202 may be represented by a graph 204. Either (or both) the application 200 or the system 202 may be actual or proposed.

Similarly, information about a particular application 200 can be expressed in terms of user-supplied numerical values 206. For example, the size or number of data records used by the application 200 in different components can be represented by an integer. Empirically determined details about a parallel processing system 202 are also easily represented by numerical values 206: for example, processor speeds, bandwidths. etc. These supplied values 206 can be based upon estimated or assumed information (e.g., from manufacturer specifications) or from actual measurements made of the performance of the application 200 on the system 202 (e.g., by monitoring software or hardware).

Based upon such a graph 204 and supplied values 206 describing an application 200 and a parallel processing system 202, an analysis is made of the performance and capacity of the system 202 running the application 200.

Initially a user provides the graph 204 and supplied values 206 to a graph compiler 208. The graph compiler 208 parses the graph 204 and supplied values 206. The graph compiler 208 then creates a flat file 210 describing the graph 204 and supplied values 206. The flat file 210 contains a list of each component in the graph. Stored with each component listed will be the supplied values 206 about that component, such as the number or size of data records, or performance characteristics. Information is also stored indicating connections between components to represent the flow of data through the application.

FIG. 3 is an example of a possible format of the flat file 210 of FIG. 2. In this format, the data is stored as ASCII text. At the beginning of each line is a code to indicate the nature of the information stored on that line. The file may be divided into sections, such as "T", "C", and "G". The heading of a section may be indicated, for example, by "TH", "CH", or "GH" respectively. "TI" indicates title or global information such as the pathname, the unit of time to be used, and the title to be used. "CT" indicates component information: name and processing rate (in MB/sec). Accordingly, FIG. 3 shows that for this system the I/O rate for the disk is 3.0 MB/sec, while the processing rate for the sort component is 0.5 MB/sec. "GT" indicates graph information. Each line shows information such as the name of the component, the number of records handled (in millions), the size of each record handled (in bytes), and the operations performed by this component and how many times that operation is performed on the data. Finally, "FH" indicates the end of the file.

Returning to FIG. 2, the flat file 210 is then passed to a capacity planner 212. The capacity planner 212 generates performance equations 214 to calculate performance characteristics of the application 200 and system 202. These performance equations 214 are specific to the topology of the graph 204 and supplied values 206. All of the performance equations 214 depend on the supplied graph 204 and supplied values 206, describing a particular application 200 and system 202 at a particular point in time, hence the label "snapshot analysis."

Figure 4:
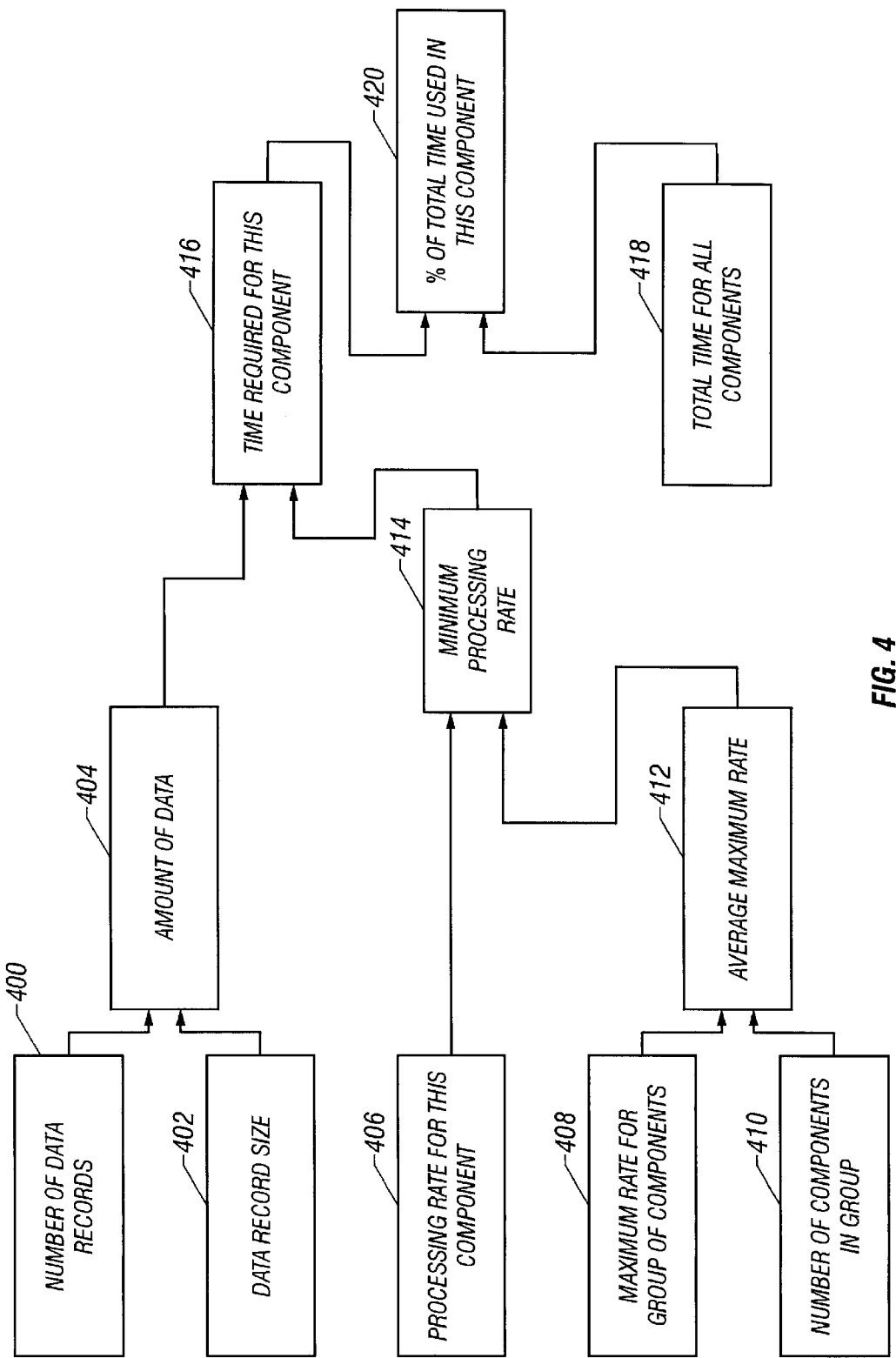
FIG. 4 is a flowchart showing the calculation of the percentage of total processing time used by a particular component.

FIG. 4 is an example of a performance equation 214 of FIG. 2. This is an example of an equation to calculate a percentage 420 of total application execution time that elapses during the processing of a specific component. A number of data records 400 is multiplied by a size of one data record 402 to calculate an amount of data 404 processed by this component. A processing rate for this specific component 406 is compared to an average maximum rate 412 for a group of these components. The average maximum rate 412 is calculated by dividing a maximum rate for the group of these components 408 by a number of components in the group 410. The lower of the processing rate for this component 406 and the average maximum rate 412 becomes a minimum processing rate 414. An amount of time required for this component 416 is the amount of data 404 divided by the minimum processing rate 414. Execution times for each component in the application (not shown) are summed to make a total time for all components 418. Then the time required for this component 416 is divided by the total time for all components 418 to calculate the percentage 420 of total application execution time that elapses during the processing of this specific component.

In the preferred embodiment, the capacity planner 212 would store the equation of FIG. 4 in a form such as:

PERCENTAGE=((NUMBER_OF_RECORDS*RECORD_SIZE)/
MIN(SPECIFIC_COMPONENT_PROCESSING_RATE,
(MAX_GROUP_PROCESSING_RATE/NUMBER_OF_
COMPONENTS_IN_GROUP) ) )/(TOTAL_TIME_ALL_
COMPONENTS_IN_GRAPH)

The performance equations 214 preferably are stored in a spreadsheet 216 along with the supplied values 206, passed along through the flat file 210. Based upon these supplied values 206, the capacity planner 212 computes calculated values and also stores them in the spreadsheet 216. In the preferred embodiment, the equations 214 are invisible to the user; only the calculated values are shown. The capacity planner 212 calculates the total execution time for an application 200 or the amount of execution time spent in a particular component. The amount of data processed in a given amount of time is also made available.

FIG. 5 shows an example of a spreadsheet 216 of FIG. 2 which is based on the same graph 204 and supplied values 206 shown in the flat file 210 of FIG. 3. In this example, the upper portion displays performance information in terms of total CPU processing requirements while the lower portion displays performance information in light of the parallel nature of the system and evaluates the elapsed real time of the system. The spreadsheet is presented as rows and columns with labels at the left and top, respectively. As discussed below with respect to the level of precision, the numbers shown are only shown to one decimal place and so are only approximations of the true calculated values (i.e., 0.0 is not necessarily 0 but could represent 0.04).

In the upper portion on the left side is a column of component names 500. To the right of those component names are processing rates in MB/sec 502 for the components on the left 500. For example, the component "Sort detail data" has a speed or processing rate of 0.5 MB/sec, "Disk I/O" speed is 4.0 MB/sec, and so on. The processing rates may be expressed in various units such as MB/sec, MB/hour, GB/hour, etc., depending on user settings. To the right is a column indicating the number of partitions into which components have been divided 504. This column 504 reflects the parallelism throughout the system. The component "Sort detail data" uses two partitions and so is running on two CPUs.

The next column to the right indicates the number of data records processed by a component 506. The column to the right of that indicates the size of each record 508. By multiplying these two columns 506, 508 the total size of the amount of data processed by each component can be calculated and is shown in the next column 510. For example, "Sort detail data" processes 68,000,000 records each being 94 bytes, so "Sort detail data" processes 6.4 GB of data.

The next two columns show the amount of data which is processed by system components 512, 514. These system components are also listed in the column of components on the far left 500. In the example shown in FIG. 5, there are entries for "Disk I/O" and "Network I/O". The total amount of data processed by these components is shown at the bottom of the column 512, 514 where the column for a component intersects with the row containing that component in the column on the left 500. Thus, three components ("Sort detail data," "Sort customer data," and "Score") have data which must be processed by the "Disk I/O" component, indicated by the three entries (6.4 GB, 0.0 GB, and 0.0 GB) in the "Disk I/O" column 512. At the bottom of the "Disk I/O" column is the sum of these entries: 6.4 GB, indicating that the "Disk I/O" component processes 6.4 GB.

The next column to the right shows the total amount of data processed by each component 516. In the upper portion, the number of partitions is not considered and so the total amount of data processed by each component 516 and the total size of the amount of data processed by each component 510 are the same. These numbers are different in the lower portion of the spreadsheet, as discussed below.

The next two columns to the right indicate the total amount of time required by each component to complete its processing 518 and the percentage of the total amount of time for all components to complete processing that is used by each component 520. All of the times for the components 518 are summed to determine the total time for all components 522 and shown on the left as "Total CPU hours". Thus, Total CPU hours indicates the total number of processing hours necessary given the supplied data and system parameters. The percentage of total time for a component 522 is calculated by dividing the total time for a component 518 by the total time for all components ("Total CPU hours") 522.

The lower portion of the example spreadsheet shown in FIG. 5 displays the parallel performance of a system. Some of the information in the columns is the same as in the upper portion (component names 524, processing rates 526, number of partitions 528, number of records 530, record size 532, total size of amount of data processed by a component 534, amount of data processed by system components 536 and 538). Significantly, the total data processed by each component 540 in the lower portion reflects the number of partitions 528 each component uses. Accordingly, "Sort detail data" uses two partitions and processes a total of 6.4 GB so each partition processes 3.2 GB. Because the partitions operate in parallel, the system is able to complete the processing of components using more than one partition more quickly.

The total time for each component 542 is shown in the next column to the right, and the percentage of total time for all components used by each component 544 is in the rightmost column. All the total times for each of the components 542 is summed to determine the total time for all components 546 and is shown on the left as "Estimated elapsed hours". The percentage of total time for a component 544 is calculated by dividing the total time for a component 542 by the total time for all components ("Estimated elapsed hours") 546. The total actual elapsed time in real time 548 is shown on the left as "Wall clock time (hours)". By dividing the total time for all components 546 by the total actual lapsed time 548, the percentage of time where the CPU (or CPUs) were busy 550 is calculated and shows on the left as "% CPU busy".

It should be remembered that the calculated values shown in the spreadsheet 216 of FIG. 2 (such as total data size 510, total time for a component 518, and percentage of total time 520 of FIG. 5) are not stored as numeric values but as equations. These equations are the performance equations 214 of FIG. 2, such as the equation shown in FIG. 4. The supplied values 206 of FIG. 2 are stored as numeric values (such as the processing rates 502, number of partitions 504, number of data records 506, or size of data records 508). This format allows the user to alter those values, for example, in order to test scenarios of different data set sizes and different parallel processing system configurations, or, alternately, to supply the most recently measured values to make the spreadsheet 216 reflect current actual performance. The equations 214 underlying the calculated values shown then recalculate to show updated calculated values.

For example, in FIG. 5, the user could change the record size 508 for the "Sort detail data" component from 94 bytes to 200 bytes. As a result, the total data size 510 for "Sort detail data" would change to 13.6 GB. The underlying equation to calculate the total data size 510 would not change, only the calculated value. The change would then propagate through other calculated values. The data size for "Disk I/O" 512 would change from 6.4 GB to 13.6 GB. The processing rate 502 would not change because this depends on a supplied value. The total time for the component "Disk I/O" 518 would change from 0.4 to 0.9 hours. This would change the total time for all components 522 to 24.3 hours. As a result, all the percentages 520 would change. "Disk I/O" would change from 1.9% to 3.7%, "Sort detail data" would change from 14.9% to 14.8%, and so on. These numbers may be different depending on the selected level of precision (see below).

As noted above, the level of precision can also be changed. For example, in FIG. 5 the precision is shown to be at one decimal place. Accordingly the total time for the component "Disk I/O" 518 is shown as 0.4 hours. In fact, using 6.4 GB and 4.0 MB/sec as inputs (assuming 4.0 MB/sec=14.4 GB/hour), the equation would generate a calculated value of 6.4/14.4=0.44444 (shown to five decimal places). If the precision were changed to two decimal places, the total time 518 would be shown as 0.44 hours. This would not be possible if a numeric value were stored instead of the equation. If 0.4 hours were stored for the total time 518, then increasing the precision would not change the value shown (perhaps displaying 0.40 hours, but not 0.44 hours because that data would have been lost). Similarly, the units of time or size can be varied. By changing the unit of time from hours to minutes, the total time "Disk I/O" 518 would change from 0.4 hours to 26.7 minutes (note that 0.44444 times 60 minutes is about 26.7 minutes and not 24 minutes). By changing the unit of size from gigabytes to megabytes, the total data size "Disk I/O" 512 would change from 6.4 GB to 6400 MB.

Accordingly, this ability to modify supplied values 206 allows the user to perform "what if" analysis by varying the characteristics of the application 200 and system 202. In particular, the user can model the effects of changing the amount or type of data to be processed or of using alternate hardware components with different characteristics. The user could also model the effects of moving the application to an entirely different hardware configuration.

In a variation of this embodiment, the graph compiler 208 may also have the ability to monitor execution of the application 200 on the system 202. In this case, the numeric values used by the graph compiler would not be estimates from the user, but represent actual measured performance information. These measured values would then propagate through the flat file on to the spreadsheet as above. This would allow a user to analyze the performance of an application on a system to assess present performance against predicted performance (perhaps generated with supplied values 206 as above). For values calculated based on equations 214 which are measurable, additional comparisons of predicted versus actual performance are made.

The user is not limited to altering only the supplied values 206. The graph 204 can also be modified. By first storing the spreadsheet 216, the user can then enter a new graph 204 to model a different system 206 or application 200. This feature allows the user to model the effect of significantly altering the hardware configuration of the system 202, such as by adding or removing a processor. This feature also would allow comparisons between entirely different hardware platforms or different applications. Accordingly, this embodiment of the invention could be very useful for comparing alternate applications to accomplish the same basic task, a common problem in resource management.

By manipulating the system configuration, the user can evaluate what type of and amount of hardware would be necessary to perform a given task in a given amount of time, thereby allowing a user to analyze resource requirements. In a similar manner, the user can analyze the capacity of a specific hardware set by altering the application and data characteristics to show execution time, or by altering the time to show data flowthrough rates. This capability is useful in evaluating the actual and potential effect of parallel processing, for example, the performance consequences of adding a processor to a single processor system can be shown. When a user is evaluating a present system to determine if it is adequate or which components are bottlenecks, the ability to compare that system to alternate hardware configurations is invaluable. Similar uses are apparent with alternate software configurations. Both types of variations (even in conjunction) may be analyzed under this embodiment.

The generation of performance evaluation equations and the user's ability to manipulate input values enable the user to evaluate a present application and parallel processing system as well as the possibilities of changing that system.

Analysis Over Time

The lower section of FIG. 2 (from the dashed arrows on) shows the basic steps in generating a performance analysis over time. The first few steps are similar to the steps described above in generating the snapshot analysis. A user supplies a graph 204 and values 206 describing an application 200 and parallel processing system 202. The graph 204 and supplied values 206 are passed to a graph compiler 208 which generates a flat file 210. A capacity planner 212 parses the flat file 210 and generates performance equations 214 based upon the information contained therein. The equations 214 are stored in a spreadsheet 216. Up to this point, the process has been the same as described above.

The user then supplies sets of values 218 describing the application 200 and the system 202, similar to those above (the user could also supply all the sets 218 at the outset, and the first spreadsheet 216 could be generated based upon the first set). For example, these sets of values 218 might represent the measured results of daily runs of data through the application 200 and system 202. The capacity planner 212 then applies the performance equations 214 to each set of values 218 and stores all the resulting sets of calculated values. Each set of calculated values is stored in a separate sheet of the spreadsheet 216, generating a set of sheets 220, one sheet 220 per set of values 218. The user can then access the multiple sheets 220 to review the calculated values over time. The values 206 within each sheet 220 may be varied by the user to allow "what-if" analysis at this point as well. The capacity planner 212 may also generate charts 224 based on the sets of values 218 and the calculated values in the sheets 220. This allows the user to compare calculated values over time by supplying a series of historical values for the system and data. Such historical values might be automatically measured daily and then supplied to the capacity planner 212 so that a daily updated chart 224 would be generated.

Figure 6:
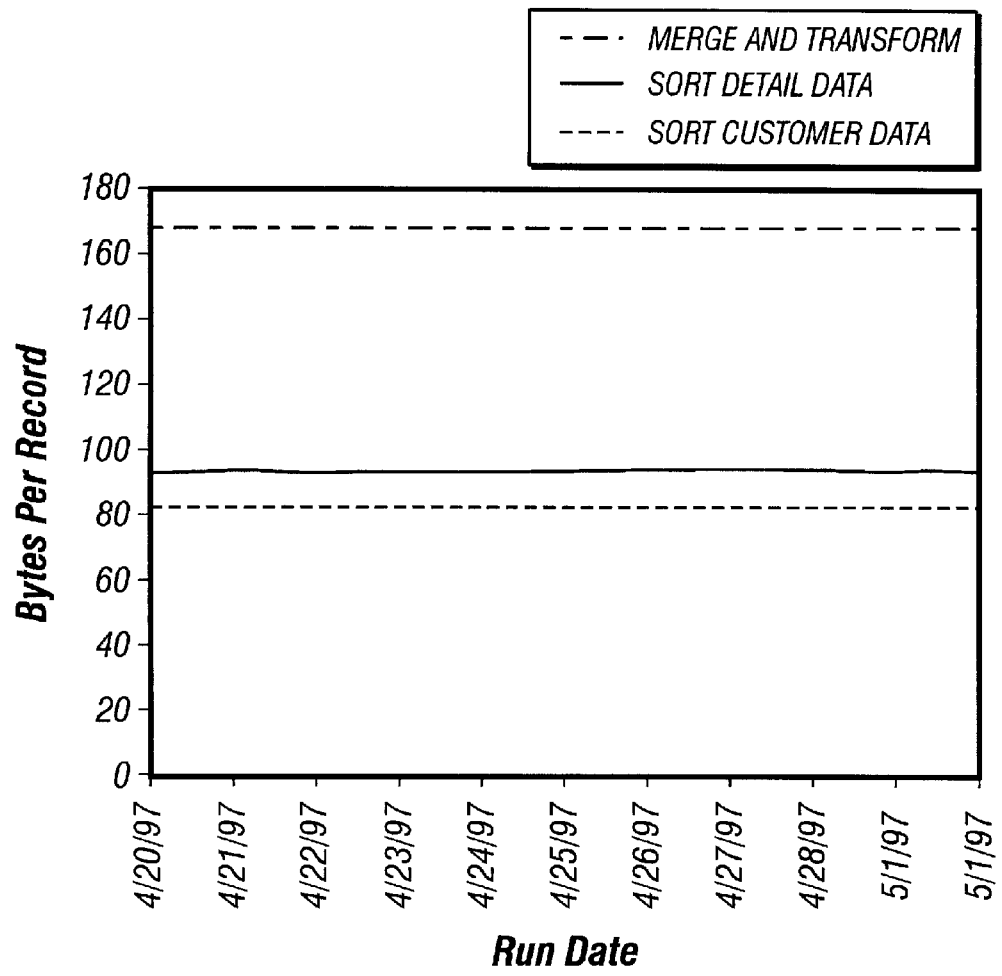
FIG. 6 and 7 are examples according to one embodiment of the invention of charts showing information about an application's execution on a parallel processing system over time.

FIG. 6 is an example of a chart 224 based on a supplied value 206 over time. The vertical axis represents the size of data records, in bytes, for a component (508 in FIG. 5). The horizontal axis represents days. Each line charted represents a different component. The data charted in FIG. 6 is based on the same set used for FIG. 3 and FIG. 5. Accordingly for the component "Sort detail data" on May 1, 1999 (the date of the values used for FIG. 5), the data record size is 94 bytes. This chart shows that the size of the data records did not vary with time, but remained constant.

Figure 7:
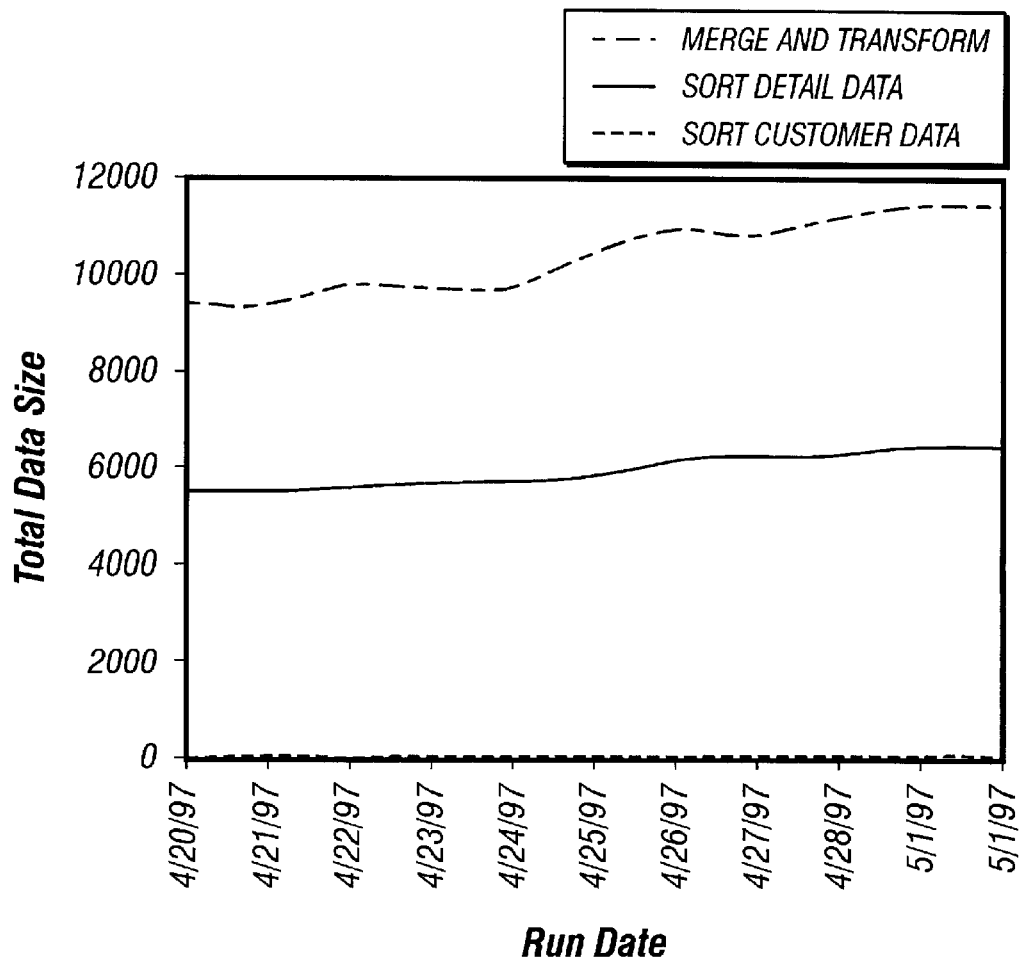

FIG. 7 is another example of one such chart 224. This chart 224 is based on a calculated value generated by applying an equation 214 to supplied values 206 over time. The vertical axis represents the total size of data, in megabytes, for a component (510 in FIG. 5). The horizontal axis represents days. Each line charted represents a different component. The data charted in FIG. 7 is based on the same set used for FIG. 3, 5, and 6. Accordingly for the component "Sort detail data" on May 1, 1997 (the date of the values used for FIG. 5), the total data size is 6400 megabytes (6.4 GB shown in FIG. 5). This chart shows that the total data size for the "Sort detail data" component is increasing, indicating that more processing capacity may be needed in the future.

Returning to FIG. 2, the capacity planner 212 then analyzes the sets of values 218 to determine trends. By analyzing the sets of values 218 with respect to time, the capacity planner 212 generates trend equations 222. A trend equation 222 is generated for each supplied value 20 206. These trend equations 222 are used to calculate estimated values 226 which might be the supplied values 206 or sets of values 218 in the future. Sheets 230 and charts 228 are then generated based upon these estimated values 226 and calculated values generated by applying the performance equations 214 to the estimated values 226. This allows the user to assess possible future resource requirements and capacity, as well as consider the trends of resource usage over time.

For example if the number of data records for a component were constant for the past 90 days, a trend equation 222 would be generated that would produce a constant estimated value 226. If the number of data records increased 10% every month, the trend equation 226 would reflect that increase. The trend equation 226 may be a simple linear model, or a more sophisticated curve-filled model.

It should be readily apparent that one variation of the "analysis over time" embodiment is to use a variable other than time. Accordingly, charts would be created that would show, for example, execution time and amount of a certain data type.

Program Implementation

The invention may be implemented in hardware of software, or a combination of both. However the invention preferably is implemented in computer programs executing on programmable computers each comprising a processor a data storage system (including volatile and nonvolatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM, CDROM, or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Two embodiments of the present invention have been described. Nevertheless, it will be understood that various modifications may be made without departing from the spirit and scope of the invention. Accordingly, it is to be understood that the invention is not to be limited by the specific illustrated embodiments, but only by the scope of the appended claims.

What is claimed is:

1. A method for analyzing the capacity of an application executing on a parallel processing system and expressed as a graph of vertices, comprising the steps of:

(a) accessing an application for processing designated data records on a parallel processing system, such application being expressed as a graph of vertices;

(b) creating a description of the sizes of data records throughout the graph;

(c) creating a performance description of each vertex in the graph;

(d) determining an execution time for each vertex in the graph;

(e) determining counts of data records assigned to corresponding vertices in the graph; and (f) creating outputting a description of the total execution time and performance of the parallel processing system based on the determined execution time and counts of data records.

2. The method of claim 1 further comprising the steps of:

(a) creating multiple descriptions of the total execution time and performance of the parallel processing system based on multiple input data sets;

(b) creating a comparison of the multiple descriptions; and (c) outputting such comparison.

3. A method for analyzing the capacity of an application executing on a parallel processing system and expressed as a graph of vertices and links given a set of supplied values, comprising the steps of:

(a) creating a description of the vertices and links of the graph including connections between vertices and links, data processing rates, and amounts of data;

(b) generating performance characteristics of the application based upon the description, and the set of supplied values, including total execution time, resource requirements, and capacity of the application;

(c) providing a means such that the supplied values can be altered, creating altered values;

(d) re-generating performance characteristics of the application based on the altered values; and (e) outputting such performance characteristics.

4. The method of claim 3 further comprising the steps of:

(a) accepting multiple sets of supplied values;

(b) generating performance characteristics of the application for each set of supplied values;

(c) calculating sets of estimated values by applying trend equations to the multiple sets of supplied values;

(d) generating performance characteristics of the application based on the estimated values; and (e) outputting the performance characteristics based on each set of supplied values and based on the estimated values.

5. A method for analyzing the capacity of an application executing on a parallel processing system and expressed as a graph of vertices and links given a set of supplied values, comprising the steps of:

(a) creating a description of the vertices and links of the graph including connections between vertices and links, data processing rates, and amounts of data;

(b) generating performance equations based upon the description which will calculate performance characteristics of the system including total execution time, resource requirements, and capacity of the application;

(c) applying the performance equations to the supplied values;

(d) providing a means such that the supplied values can be altered, creating altered values;

(e) applying the performance equations to the altered values; and (f) outputting the results of the applied performance equations.

6. The method of claim 5 further comprising the steps of:

(a) accepting multiple sets of supplied values;

(b) applying the performance equations to each set of supplied values;

(c) generating trend equations based upon the multiple sets of supplied values;

(d) calculating sets of estimated values by applying the trend equations to the multiple sets of supplied values;

(e) applying the performance equations to the estimated values; and (f) providing a means of outputting the supplied values, the estimated values, and stored results.

7. A computer program for analyzing the capacity of an application executing on a parallel processing system and expressed as a graph of vertices and links given a set of supplied values, the computer program being stored on a media readable by a computer system, for configuring the computer system upon being read and executed by the computer system to perform the functions of:

(a) creating a description of the vertices and links of the graph including connections between vertices and links, data processing rates, and amounts of data;

(b) generating performance characteristics of the application based upon the description, and the set of supplied values, including total execution time, resource requirements, and capacity of the application;

(c) providing a means such that the supplied values can be altered, creating altered values;

(d) re-generating performance characteristics of the application based on the altered values; and (e) outputting such performance characteristics.

8. The computer program of claim 7 further comprising the functions of:

(a) accepting multiple sets of supplied values;

(b) generating performance characteristics of the application for each set of supplied values;

(c) calculating sets of estimated values by applying trend equations to the multiple sets of supplied values;

(d) generating performance characteristics of the application based on the estimated values; and (e) outputting the performance characteristics based on each set of supplied values and based on the estimated values.

9. A computer-readable storage medium, configured with a computer program for analyzing the capacity of an application executing on a parallel processing system and expressed as a graph of vertices and links given a set of supplied values, where the storage medium so configured causes a computer to operate in a specific and predefined manner to perform the functions of:

(a) creating a description of the vertices and links of the graph including connections between vertices and links, data processing rates, and amounts of data;

(b) generating performance characteristics of the application based upon the description, and the set of supplied values, including total execution time, resource requirements, and capacity of the application;

(c) providing a means such that the supplied values can be altered, creating altered values;

(d) re-generating performance characteristics of the application based on the altered values; and (e) outputting such performance characteristics.

10. The computer-readable storage medium of claim 9 further comprising the functions of:

(a) accepting multiple sets of supplied values;

(b) generating performance characteristics of the application for each set of supplied values;

(c) calculating sets of estimated values by applying trend equations to the multiple sets of supplied values;

(d) generating performance characteristics of the application based on the estimated values; and (e) outputting the performance characteristics based on each set of supplied values and based on the estimated values.

11. A computer program, stored on a computer-readable medium, for analyzing the capacity of an application executing on a parallel processing system and expressed as a graph of vertices and links given a set of supplied values, the computer program comprising instructions for causing a computer system to:

(a) create a description of the vertices and links of the graph including connections between vertices and links, data processing rates, and amounts of data;

(b) generate performance characteristics of the application based upon the description, and the set of supplied values, including total execution time, resource requirements, and capacity of the application;

(c) provide a means such that the supplied values can be altered, creating altered values;

(d) re-generate performance characteristics of the application based on the altered values; and
(e) output such performance characteristics.

12. The computer program of claim 11, further comprising instructions for causing the computer to:
(a) accept multiple sets of supplied values;
(b) generate performance characteristics of the application for each set of supplied values;
(c) calculate sets of estimated values by applying trend equations to the multiple sets of supplied values;
(d) generate performance characteristics of the application based on the estimated values; and
(e) output the performance characteristics based on each set of supplied values and based on the estimated values.

* * * * *